I. R. REEVES.
HAY RACK BRAKE.
APPLICATION FILED AUG. 24, 1909.
958,766.
Patented May 24, 1910.
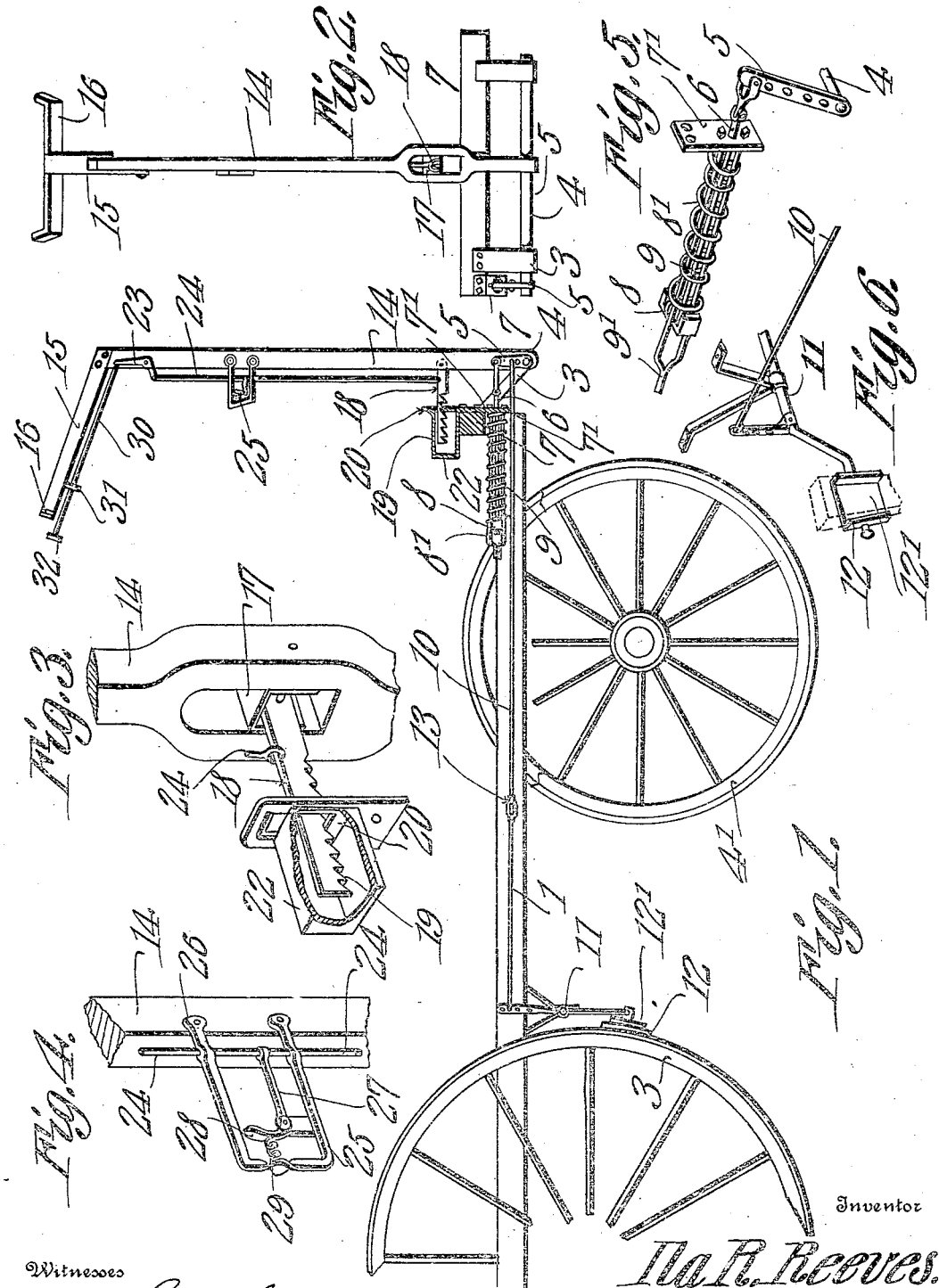

UNITED STATES PATENT OFFICE.

ILA R. REEVES, OF ADELPHI, IOWA.

HAY-RACK BRAKE.

958,766.  Specification of Letters Patent.  Patented May 24, 1910.

Application filed August 24, 1909. Serial No. 514,442.

*To all whom it may concern:*

Be it known that I, ILA R. REEVES, a citizen of the United States, residing at Adelphi, in the county of Polk and State of Iowa, have invented a new and useful Hay-Rack Brake, of which the following is a specification.

This invention has relation to hay-rack brakes and it consists in the novel construction and arrangement of its parts as hereinafter shown and described.

The object of the invention is to provide a brake mechanism which is especially adapted to be used upon hay-racks, and which may be manipulated in applying and releasing the same from several elevations,— that is to say, when the rack is empty, the brake may be applied and released by an operator manipulating the same from a relatively low elevation, while, when the rack is loaded the operator may be upon the top of the load and operate the said brake mechanism, as indicated.

In the accompanying drawings:—Figure 1 is a side elevation of a portion of the rack, with the brake mechanism applied thereto. Fig. 2 is a front elevation of a portion of the rack with the brake mechanism applied thereto. Fig. 3 is a perspective view of a locking device forming a part of the brake mechanism. Fig. 4 is a perspective view of a device forming a part of the brake mechanism which is susceptible of being operated by one at a relatively low elevation. Fig. 5 is a perspective view of a return spring mechanism used upon the brake mechanism. Fig. 6 is a perspective view of a portion of a brake beam and attached parts.

As shown in the drawings, the reference numeral 1 indicates the bottom of a hay-rack, and said rack is supported upon the running-gear of a wagon, of which the supporting wheels 3 and 4' constitute component parts. Brackets 3 extend from the front of the hay-rack, and a shaft 4 is journaled in the said bracket. An upstanding arm 5 is fixed to one end of the shaft 4. A rod 6 is pivotally connected at one end to the said arm 5 and passes through an opening provided in the cross-bar 7 of the bottom 1 of the hay-rack. A head 8 is secured upon the rear end of the rod 6, and a coil spring 9 is interposed between the forward face of the head 8 and a wear plate 7' on the cross-piece 7. The said rods 8' extend from plate 7' and through the spring, these rods forming guides for the head and spring. The rods are connected at their outer or free ends, as shown at 9'. The spring 9 is under tension with a tendency to hold the upper end of the arm 5 toward the cross-piece 7, and, by adjusting the head 8 upon the rod 6 the tension of the spring 9 may be increased or diminished, as desired. The head 8 is adjusted upon the rod 6 by turning the nut 8' as seen in (Fig. 1) which is screw threaded upon the rod 6 and bears against the side of the head 8.

A brake rod 10 is pivotally connected at its forward end with the arm 5, and at its rear end with a brake-beam 11, which is located in front of the rear wheels 3 of the running-gear, and which is provided with brake shoes 12 having tapered sockets 12' to receive the wear blocks. The brake rod 10 is made in sections and the said sections are joined together by a turn-buckle 13, whereby the said rod, as an entirety, may be longitudinally extended or contracted, as desired. An upwardly disposed bar 14 is fixed to the shaft 4 at a point intermediate of the ends thereof, and, at its upper end is fixed an upwardly and rearwardly disposed arm 15. The arm 15 is provided at its rear end with a fixed foot-rest 16. A hood 17 is fixed in the lower portion of the bar 14 and a catch 18 is pivotally connected with the said bar 14 and has its forward end lying under the said hood 17. The said catch 18 is provided at its lower edge with a series of the teeth 19, and the said catch passes transversely through a loop 20, which is fixed on the cross piece 7. The loop 20 is provided with a rearwardly disposed shield 22, which lies over and about the rear portion of the rack-bar 18. A bell crank lever 23 is fulcrumed near the upper end of the bar 14 and the lower end of the said bell-crank lever 23 is connected by means of a rod 24 with the rack-bar 18 at a point behind its pivotal connection with the bar 14. A bracket 25 is fixed to the bar 14, and is provided with vertically disposed eyes 26, through which the rod 24 passes, and which serve as guides for the said rod.

A hand lever 27 is fulcrumed in the bracket 25 and is pivotally connected at one end with the rod 24, and is provided at its other end with an angularly disposed handle extremity 28. A coil spring 29 is interposed between the outer end of the bracket 25 and the said handle extremity 28 of the lever 27. The spring 29 is under tension with a tendency to hold that end of the lever 27 which is connected with the rod 24 in a lowered position. A push rod 30 is pivotally connected at one end with the upper end of the bell-crank lever 23 and passes through a guide 31 which is fixed to the rearwardly disposed arm 15 at the upper end of the bar 14. At its rear end the said push rod 30 is provided with a heel-rest 32, which is located in close proximity to the foot-rest 16 and normally projects beyond the rear side of the same.

From the above description it is obvious that when the shaft 4 is rotated upon its axis, so that the upper end of the arm 5 is carried away from the cross-piece 7, the brake rod 10 will be moved longitudinally, and consequently, the brake beam 11 will be revolved, and the blocks on the shoes 12 carried by the said beam will be brought in contact with the periphery of the said wheels. Thus the brake is applied, and, when the shaft 4 rotates in the opposite direction the shoes 12 are moved away from the wheels 3. Should an operator be standing upon the bottom 1 of the hay-rack and desire to apply the brake as indicated he grasps the bracket 25 and swings the lever 27 upon its fulcrum, whereby the rod 24 is moved longitudinally in an upward direction through the guide 26. This movement upon the part of the rod 24 disengages the teeth 19 of the rack-bar 18 from the lower edge of the loop plate 20, and the bar 14 is then free to be swung in a forward direction. The operator then pushes the said bar 14 in a forward direction, which partially rotates the shaft 4 upon its axis, and, as above described, the brake rod 10 is moved longitudinally and the brake-shoes 12 are applied to the peripheries of the wheels 3. When the brake is thus applied the operator may release his grasp upon the handle portion 28 of the lever 27, when the said rod 24 is free to move in a downward direction, and the teeth 19 of the rack-bar 18 may engage the lower end of the loop in the loop plate 20, and thus the brake shoes 12 will be positively held in applied positions against the peripheries of the wheels 3. When it is desired to remove the brake shoes 12 from the peripheries of the said wheels, an operator grasps the bracket 25 and swings the lever 27, which, as above described moves the rod 24 longitudinally, and the teeth 19 of the rack-bar 18 disengage the edge of the loop in the loop-plate 20. Thus the bar 14 is free to swing in a rearward direction under the tension of the spring 9, as above described.

When the rack is loaded and it is desired to apply the brake, and should the operator be upon the load, he will place his foot upon the foot-rest 16 and his heel against the rest 32. Thus the rods 30 may be moved longitudinally with relation to the arm 15, which will cause the bell-crank lever 23 to swing upon its fulcrum, and thus the rod 24 will be moved longitudinally, as above indicated, and with the result stated. Thus the bar 14 may be swung away from the cross-piece 7, and the brake shoes 12 as indicated. Should it be desired to hold the brake shoes 12 against the peripheries of the wheels 3 the operator removes his heel from the rest 32, and the rods 30 will move rearwardly with relation to the arm 15 under the tension of the spring 29, and the weight of the rack-bar 18. Thus the teeth of the rack-bar will engage the lower edge of the loop in the loop plate 20. To release the shoes 12 from engagement with the peripheries of the wheels 13 the operator places his heel against the rest 32 and moves the rod 30 longitudinally which will elevate, through intervening connecting parts, the rack-bar 18, and thus the bar 15 is free to swing rearwardly under the tension of the spring 9.

What is claimed is:—

1. A brake mechanism for a rack comprising brackets attached to the rack, a shaft journaled in the brackets and having an arm for connection with the brake-rod, a spring tension means attached to said arm and adapted to hold the free end thereof in a rear position, a bar fixed to the shaft, a bracket attached to the bar, a lever fulcrumed therein, a rack-bar pivotally connected with the first said bar, a loop plate mounted upon the rack and receiving the rack-bar, a bell crank lever fulcrumed to the first said bar, means operatively connecting the bell-crank lever with the rack-bar, and the lever in the bracket, and means for swinging the said bell-crank lever.

2. A brake mechanism for wagon-racks comprising brackets, a shaft journaled in the brackets, and having a vertically disposed arm, spring tension means for holding the said arm in a rear position, said arm adapted to be connected with the brake-rod, a bar fixed to the shaft, an upwardly and rearwardly disposed arm fixed to the bar, a foot-rest fixed to said arm, a rack-bar pivoted to the first said bar, a bracket attached to said bar, a lever fulcrumed to the bracket, a bell-crank lever fulcrumed to the bar, a rod operatively connecting the bell crank lever with the first said lever and the rack-bar, a rod connected with the bell-crank lever and having a seat located beyond said foot-rest.

In testimony that I claim the foregoing as my own, I have hereto affixed my signature in the presence of two witnesses.

ILA R. REEVES.

Witnesses:
JOSHUA JESTER,
L. A. JESTER.